May 2, 1967

D. R. RUMMLER 3,316,991

AUTOMATIC FORCE MEASURING SYSTEM

Filed May 26, 1965

*INVENTOR*
DONALD R. RUMMLER

BY

*William H. King*
ATTORNEYS

INVENTOR
DONALD R. RUMMLER

BY
*William H. King*
ATTORNEYS

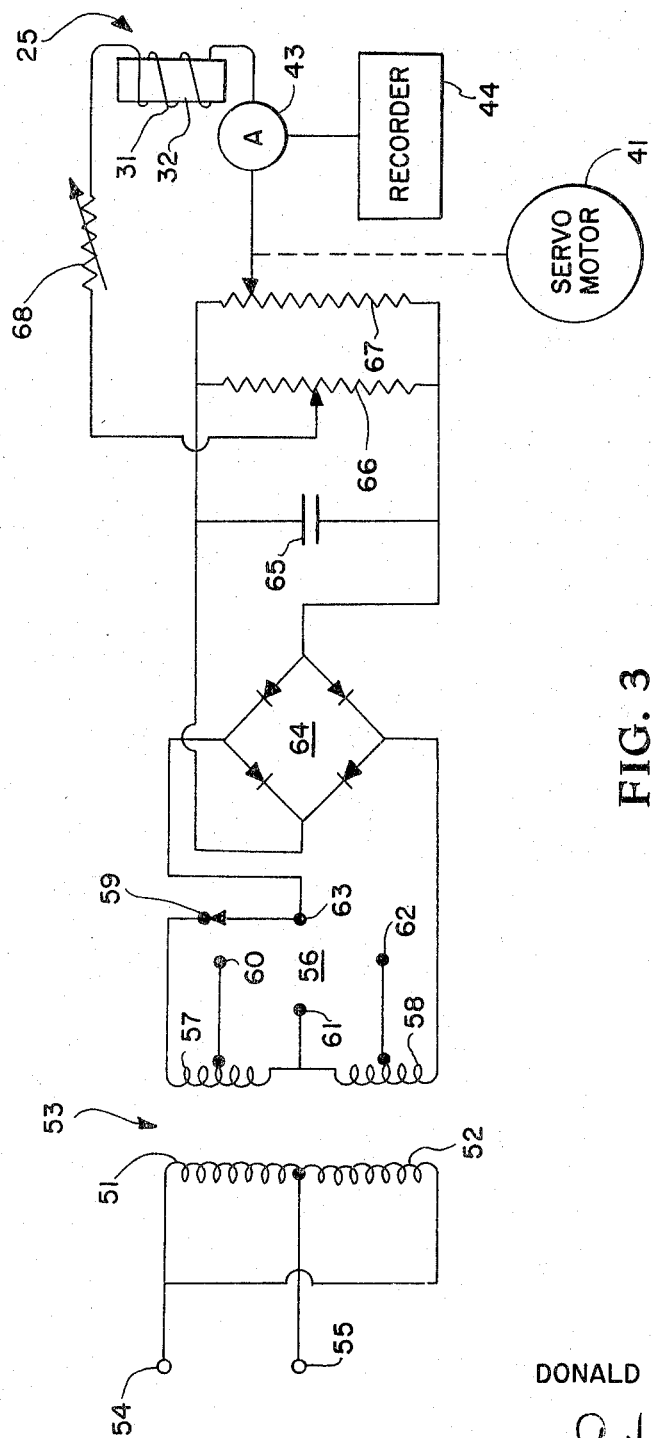

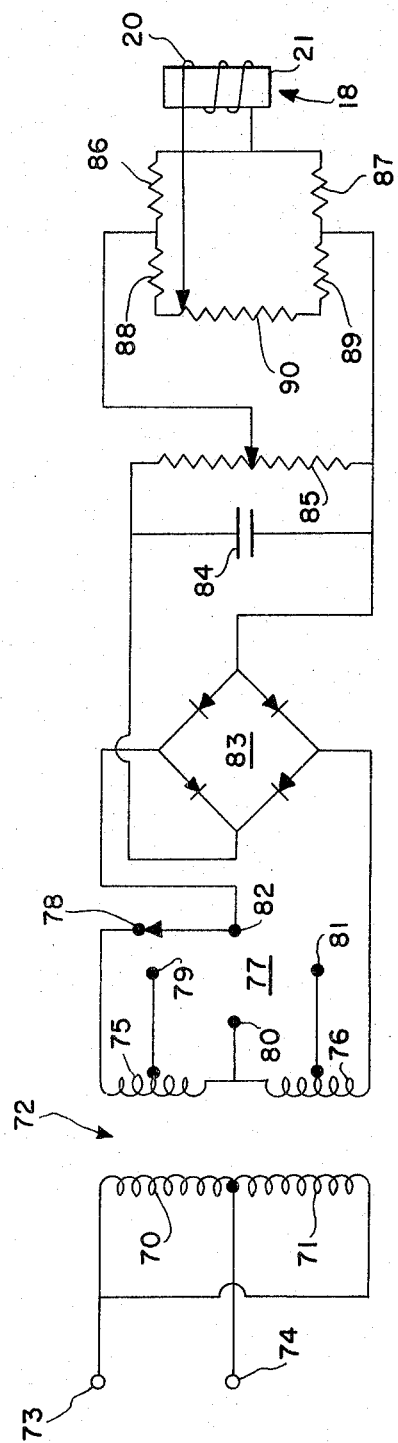

United States Patent Office 3,316,991
Patented May 2, 1967

---

3,316,991
AUTOMATIC FORCE MEASURING SYSTEM
Donald R. Rummler, Hampton, Va., assignor to the United States of America as represented by the Administrator of the National Aeronautics and Space Administration
Filed May 26, 1965, Ser. No. 459,138
8 Claims. (Cl. 177—210)

The invention described herein may be manufactured and used by or for the Government of the United States of America for governmental purposes without the payment of any royalties thereon or therefor.

This invention relates generally to a weighing device and more specifically concerns a weighing and recording device for obtaining the precise automatic recording, for long periods of time, of small changes in force or weight without appreciable movement of the weighing device or the object being weighed.

The prior art devices for measuring a weight or a force are dependent on either the magnitude of the movement of a part of the weighing device or a complex motion-sensing device to sense the motion of a weighing beam and to restore it to its balanced position. These devices are usually weighing beams or springs whose displacements due to weight or force changes are sensed by a transducer. The output of the transducer is then used as a measure of the weight or force change. When the range of one of these devices is changed, it must be mechanically tared either by the addition of a tare weight in the case of a weighing beam or the substitution of a different spring when a spring device is used. Since these weight range changes are a function of mechanical displacement and the output of the transducer, the weighing devices are difficult to construct because they have to be calibrated for each range. In addition, once one of these devices is in operation, there are no provisions for changing sensitivity or weighing range.

It is therefore an object of this invention to provide a weighing device in which there is no appreciable motion of the weighing beam used by the device.

Another object of this invention is to use a simple, motion-sensing device to sense minute motions of the weighing beam and maintain the beam substantially in a balanced position.

A further object of this invention is to provide a weighing device in which the weighing range of the device is easily changed.

Still another object of this invention is to provide a weighing device in which the sensitivity of the device can be easily changed.

A still further object of the invention is to provide a simple, electrical taring network for weighing devices.

Yet another object of this invention is to provide an electrical weighing device in which there is a linear relationship between input and output thereby making calibration simple.

In accomplishing these and other objects, a variable differential transformer is used to sense the motion of the end of a weighing beam opposite the end where the object to be weighed is placed. The output from the variable differential transformer is amplified and then applied to a servo motor. The servo motor changes the output current of a variable current network. The current from the variable current network is passed through the coil of a solenoid that has its core rigidly attached to the end of the weighing beam to which the variable differential transformer is attached. The current through the coil of the solenoid forces the weighing beam back into substantially its balanced position. The current through the coil is measured and recorded to give the indication of the weight of the object being weighed. The taring network includes a solenoid and a linear variable current network. The core of the solenoid is rigidly attached to the end of the weighing beam where the object being weighed is located. The output from the linear variable current network is passed through the coil of the solenoid to apply taring force to the weighing beam.

Other objects and advantages of this invention will further become apparent hereinafter and in the drawings, in which:

FIG. 3 is a schematic drawing of the electrical circuitry of the variable current network shown in FIG. 2; and FIG. 4 is an electrical schematic diagram of the taring network used by this invention.

Figure 1:
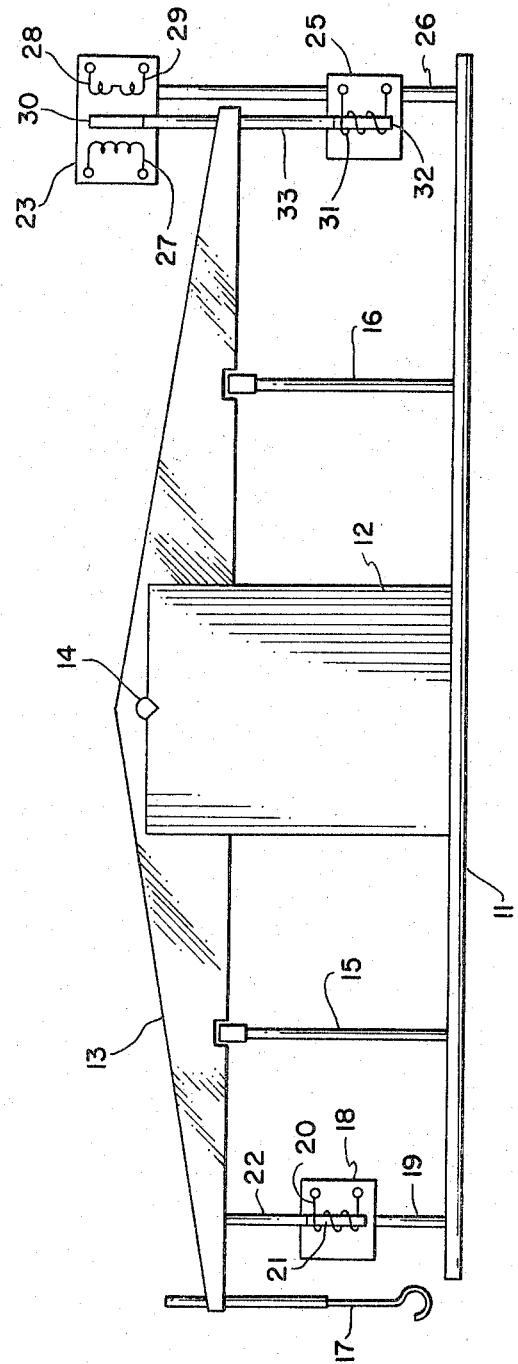
FIG. 1 is a schematic drawing of the mechanical components of this invention.

In describing the preferred embodiment of the invention, illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 11 in FIG. 1 designates a base on which a support is located. A weighing beam 13 is supported on support 12 by means of a fulcrum 14. A rod 15 and a rod 16 are attached to base 11 to prevent weighing beam 13 from moving appreciably from its balanced position. On one end of weighing beam 13, there is attached a hook 17 for the purpose of supporting the object to be weighed. On the same end of weighing beam 13 a solenoid 18 is supported by a rod 19. Solenoid 18 consists of a coil 20 and a core 21. Core 21 is attached to weighing beam 13 by means of a rod 22. Coil 20 is supported by rod 19 and core 21 is free to move relative to the coil. Solenoid 18 is part of the taring network which will be explained in detail in FIG. 4.

At the other end of weighing beam 13 a variable differential transformer 23 and a solenoid 25 are supported on base 11 by a rod 26. Variable differential transformer 23 consists of a primary winding 27, two secondary windings 28 and 29, and a core 30. Solenoid 25 consists of a coil 31 and a core 32. Cores 30 and 32 are attached to the weighing beam 13 by means of a rod 33 and is free to move relative to the transformer windings 27, 28, 29, and the coil 31, respectively.

Figure 2:
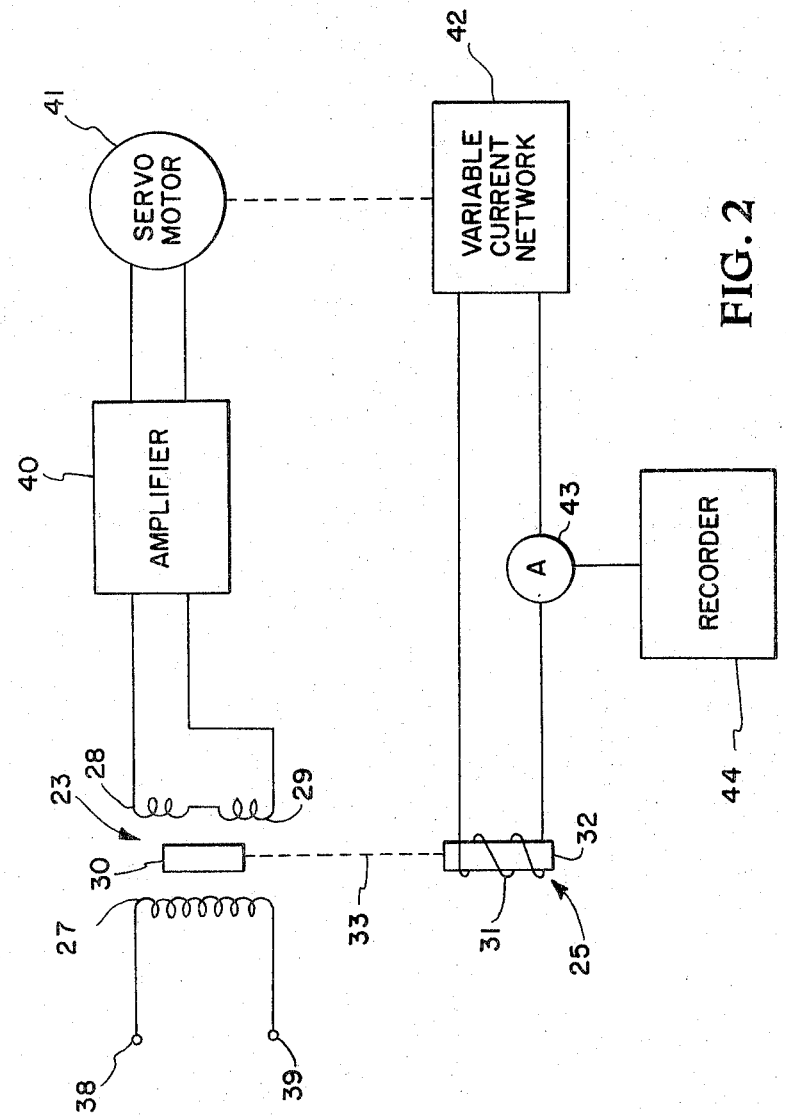
FIG. 2 is a block diagram of this invention excluding the taring network.

The primary winding 27 of variable differential transformer 23 in FIG. 2 is connected to an A.C. source through terminals 38 and 39. The coupling between primary winding 27 and secondary windings 28 and 29 is controlled by the position of core 30. When the core is in its central or neutral position, the couplings to the two secondaries are equal and as a result, the secondary output voltages are equal. If the core is moved upward, the coupling to secondary 28 increases while that to secondary 29 decreases with corresponding increases and decreases in secondary voltages. Similarly, movement of core 30 below its neutral position increases the voltages across secondary 29 and decreases the voltage across secondary 28. The secondary windings are so poled that the secondary voltages are in phase opposition. The voltage across secondary windings 28 and 29 is applied to a high gain amplifier 40 and then applied to a servo motor 41. Servo motor 41 controls the current output of a variable current network 42 which will be described in detail in FIG. 3. This current is passed through a coil 31 and is phased so that it creates a force on core 32 that opposes any motion of core 30. The current through coil 31 is measured by a multirange ammeter 43 and recorded by a recorder 44.

Referring now to FIG. 3, the details of the variable current network 42 in FIG. 2 will be described in detail. The primary windings 51 and 52 of a transformer 53 are connected to an A.C. source by means of terminals 54 and 55. The terminals of a four-position selector switch 56 are connected to the secondaries 57 and 58 of transformer 53, as shown. A terminal 59 is connected to the upper terminal of secondary winding 57; a terminal 60 is connected to the center tap of secondary winding 58. A terminal 63 of switch 56 and the power terminal of secondary winding 58 are connected to a rectifier 64. The purpose of selector switch 56 is to change the voltage applied to the variable current network and thus change the sensitivity of the weighing device. For example, if the output of each of the secondaries 57 and 58 is six volts, when the selector switch is in the position shown, twelve volts are applied to rectifier 64; when it is positioned on terminal 60, nine volts are applied to the rectifier; when it is positioned on terminal 61, six volts are applied to the rectifier; and when it is positioned on terminal 62, three volts are applied to the rectifier. The output from rectifier 64 is connected across a smoothing capacitor 65, a potentiometer 66 and a potentiometer 67. The sliders of potentiometers 66 and 67 are connected across a variable resistor 68 which is connected in series with coil 31 of solenoid 25. The position of the slider of potentiometer 67 is controlled by servo motor 41. Potentiometer 66 is capable of changing both the direction and magnitude of the current in coil 31 and can be used to change the range and/or the direction of the force measurement. Variable resistor 68 provides a control of the current through coil 31 and can, consequently, change the range of the weighing device. Since ammeter 43 is a multirange ammeter, the range of the weighing device can be changed without changing the recording range of recorder 44.

The taring network of this invention will now be described while referring to FIG. 4. The primary windings 70 and 71 of a transformer 72 are connected to an A.C. source of voltage by terminals 73 and 74. The secondary windings 75 and 76 of transformer 72 are connected to the terminals of a four-position selector switch 77, as shown. The top of secondary winding 75 is connected to a terminal 78; the center tap of secondary winding 75 is connected to a terminal 79; the junction between secondary windings 75 and 76 is connected to a terminal 80; and the center tap of secondary winding 76 is connected to a terminal 81. The lower end of secondary winding 76 and terminal 82 of selector switch 77 are connected across a rectifier 83. Selector switch 77 is used for the same purpose as selector switch 56 in FIG. 3. The output from rectifier 83 is connected across a smoothing capacitor 84 and a potentiometer 85. The slider of potentiometer 85 and the lower end of potentiometer 85 are connected across a resistor 86 and a resistor 87 connected in series. Also, the slider of potentiometer 85 and the lower end of potentiometer 85 are connected across a resistor 88, a potentiometer 90 and a resistor 89 connected in series. Resistors 86 and 87 have equal resistances and resistor 88 has a resistance that is equal to the sum of the resistances of potentiometer 90 and resistor 89. The slider of potentiometer 90 and the junction of resistors 86 and 87 are connected across coil 20 of solenoid 18. When the slider of potentiometer 90 is set at the top of potentiometer 90 as shown, then the bridge will be balanced and no current will flow through coil 20. As the slider of potentiometer 90 moves down, the bridge becomes unbalanced and a current will flow through coil 30 that is linearly proportional to the distance moved by the slider of potentiometer 90. This current through coil 30 applies a force to weighing beam 13 that tends to rotate it in a clockwise direction. It has been found that 500 ohms, 400 ohms, and 100 ohms are suitable values for resistors 86, 87, and 88, resistor 89 and potentiometer 90, respectively. Potentiometer 85 provides an additional means for changing the range of the taring network.

In operation of the preferred embodiment of this invention without utilizing the taring network, when a weight is placed on hook 17, weighing beam 13 will tend to rotate in a counterclockwise direction. This movement of weighing beam 13 causes core 30 of the variable differential amplifier 23 to move slightly which causes a voltage to appear across the windings 28 and 29 of variable differential amplifier 23. This voltage is amplified by amplifier 40 and then fed to a servo motor 41 which moves the slider of potentiometer 67 causing a current to flow through coil 31 of solenoid 25 and variable resistor 68. The current flow through coil 31 applies a force to core 32 that tends to counteract or act in opposition to the movement of core 30. This force applied to the end of weighing beam 13 causes the beam to be maintained in substantially its balanced position. The current through coil 31 is directly proportional to the weight attached to hook 17. This current is measured by ammeter 43 and recorded by recorder 44. When the taring network is utilized, the slider of potentiometer 90 is set to a value of the desired taring weight. This setting of the slider of potentiometer 90 produces a current through coil 20 that is directly proportional to the setting. The current through coil 20 causes a force to be applied to core 21 of solenoid 18 which applies a force to weighing beam 13 tending to cause it to rotate in a clockwise direction.

The advantages of this invention are that it provides a weighing device that it simple and accurate; it provides a weighing device in which the sensitivity and range of the device is easily changed; it provides a simple electrical taring network for a weighing device; and it provides an electrical weighing device in which there is a linear relationship between input and output thereby making calibration simple.

It is to be understood that the form of the invention herein shown and described is to be taken as a preferred embodiment. Various changes may be made in the shape, size, and arrangement of parts. For example, equivalent elements may be substituted for those illustrated and described herein, parts may be reversed and certain features of the invention may be utilized independently of the use of other features, all without departing from the spirit or scope of the invention as defined in the following claims.

What is claimed is:

1. In a weighing device including a weighing beam a taring device comprising: a solenoid including a core and a coil with the core rigidly attached to said weighing beam; first and second equal resistors connected in series across a voltage source; a third resistor, a potentiometer and a fourth resistor connected in series across said voltage source with the resistance of the third resistor being equal to the sum of the resistances of the potentiometer and the fourth resistor; and means for connecting said coil between the slider of said potentiometer and the junction of said first and second resistors whereby when the slider is positioned to include the entire resistance of the potentiometer in a leg of the resulting bridge with the fourth resistor no current will flow through the coil and when the slider is moved the current flow through the coil will be substantially directly proportional to the movement of the slider and a corresponding force will be applied to said weighing beam.

2. A variable current network whose current output is substantially directly proportional to the position of the slider of a potentiometer comprising: a voltage source; first and second equal resistors connected in series across said voltage source; a third resistor, said potentiometer and a fourth resistor connected in series across said voltage source with the resistance of the third resistor being equal to the sum of the resistances of the potentiometer and the fourth resistor; and circuit means connected between said slider and the junction of said first and second resistors whereby when the slider is positioned to include the entire resistance of the potentiometer in a leg of the resulting bridge with the fourth resistor no current will flow through said circuit means and when the slider is moved the current flow through said circuit means will be substantially directly proportional to the movement of the slider.

3. A weighing device comprising: a weighing beam having first and second ends; a variable differential transformer having a core, a primary winding connected across an A.C. voltage source, and two secondary windings connected in series in phase opposition; means for rigidly attaching said core to the first end of said weighing beam; a solenoid having a core and a coil; means for rigidly attaching the core of said solenoid to the first end of said weighing beams; first and second potentiometers connected in parallel across a voltage source with the slider of said first potentiometer set at some central position; means for connecting said coil between the sliders of said first and second potentiometers; a servo motor connected to mechanically move the slider of said second potentiometer; means for connecting the voltage across said two secondary windings to said servo motor; and means for attaching the object to be weighed to the second end of said weighing beam whereby the current generated in said coil is proportional to the weight of said object.

4. A weighing device in accordance with claim 3 wherein said means for connecting the voltage across said two secondary windings to said servo motor includes a high gain amplifier.

5. A weighing device in accordance with claim 3 wherein said means for connecting said coil between the sliders of said first and second potentiometers includes a variable resistor whereby the range of currents in said coil can be changed.

6. A weighing device in accordance with claim 3 in combination with means for measuring and recording the current that goes through said coil.

7. A weighting device in accordance with claim 3 in combination with means for applying a force to said weighing beam to represent a taring weight.

8. A weighing device in accordance with claim 3 in combination with a taring network comprising: a solenoid including a core and a coil with the core rigidly attached to said weighing beam; first and second equal resistors connected in series across a voltage source; a third resistor, a potentiometer and a fourth resistor connected in series across said voltage source with the resistance of the third resistor being equal to the sum of the resistances of the potentiometer and the fourth resistor; and means for connecting said coil between the slider of said potentiometer and the junction of said first and second resistors whereby when the slider is positioned to include the entire resistance of the potentiometer in a leg of the resulting bridge with the fourth resistor no current will flow through the coil and when the slider is moved the current flow through the coil will be substantially directly proportional to the movement of the slider and a corresponding force will be applied to said weighing beam.

References Cited by the Examiner

UNITED STATES PATENTS

| | | | |
|---|---|---|---|
| 2,602,660 | 7/1952 | Shannon | 177—210 |
| 2,825,864 | 3/1958 | Eagan | 323—75 |
| 2,832,535 | 4/1958 | Sherman | 177—210 |
| 2,885,611 | 5/1959 | MacGeorge | 177—210 |
| 3,079,792 | 3/1963 | Hubbs | 177—210 |
| 3,172,493 | 3/1965 | Von Koch et al. | 177—210 |

References Cited by the Applicant

UNITED STATES PATENTS

| | | |
|---|---|---|
| 2,067,741 | 1/1937 | Weckerly. |
| 2,631,027 | 3/1953 | Payne. |
| 2,754,109 | 7/1956 | Eyraud et al. |
| 2,827,787 | 3/1958 | Kroeger. |
| 2,940,747 | 6/1960 | Eder et al. |
| 2,994,391 | 8/1961 | Ecker. |
| 3,061,027 | 10/1962 | Berge et al. |
| 3,106,978 | 10/1963 | Cahn. |

STEPHEN J. TOMSKY, *Primary Examiner.*

RICHARD B. WILKINSON, *Examiner.*

H. B. KATZ, *Assistant Examiner.*